United States Patent [19]

Courshon, Jr.

[11] 4,179,241

[45] Dec. 18, 1979

[54] FULL FEATHERING, REVERSIBLE PITCH, CONSTANT RPM PROPELLER

[75] Inventor: Jacob B. Courshon, Jr., Park Forest, Ill.

[73] Assignee: High Harbin, Elk Grove Village, Ill.; a part interest

[21] Appl. No.: 847,245

[22] Filed: Oct. 31, 1977

[51] Int. Cl.$^2$ .................. B64C 11/34; B63H 3/04
[52] U.S. Cl. .................... 416/137; 416/138; 416/139; 416/166
[58] Field of Search ............ 416/137, 136, 138 R, 416/138 A, 139 R, 166, 145, 164

[56] References Cited

U.S. PATENT DOCUMENTS 3,145,780  8/1964  Kean ........................... 416/137

FOREIGN PATENT DOCUMENTS

| | | | |
|---|---|---|---|
| 789794 | 11/1935 | France | 416/136 |
| 246141 | 3/1926 | Italy | 416/137 |
| 323848 | 1/1935 | Italy | 416/166 |
| 434604 | 9/1935 | United Kingdom | 416/164 |
| 567372 | 2/1945 | United Kingdom | 416/136 |
| 1372962 | 11/1974 | United Kingdom | 416/139 |

*Primary Examiner*—Everette A. Powell, Jr.
*Attorney, Agent, or Firm*—Jack Schuman

[57] ABSTRACT

A pitch change slide is mounted for longitudinal movement on a propeller shaft hub adapter in turn secured to the engine shaft of an aircraft engine, the said slide carrying a plurality of toothed racks each engaged with a spur gear on the base of one of a plurality of rotatably mounted propeller blades. Reciprocation of the pitch change slide changes the pitch of the propeller blades. The pitch change slide carries a coiled spring. A spring pressure slide, mounted for longitudinal movement on the propeller shaft hub adapter, has a flange bearing against the coiled spring, and is reciprocable on the propeller shaft hub adapter through a control rod operable from the aircraft cabin, thereby to adjust the degree of compression of the spring. Weights are mounted on the propeller blades and generate centrifugal force as the engine shaft turns, the said centrifugal force tending to rotate and change the pitch of the propeller blades. At a selected constant RPM, the compression of the spring is adjusted so as to balance the pitch changing force of the weights and the aerodynamic pitching moments of the blades. The pitch change slide may also be positioned to permit operation in a full high RPM (low pitch) mode, or selectively to a reverse thrust mode. A fail safe feature permits safe operation of the aircraft if the coiled spring should fail.

2 Claims, 5 Drawing Figures

FULL FEATHERING, REVERSIBLE PITCH, CONSTANT RPM PROPELLER

BACKGROUND OF THE INVENTION

1. Field of the Invention

This invention relates, broadly speaking, to an arrangement for controlling the pitch and rotational velocity of a propeller and of the engine driving the propeller. More particularly, this invention relates to an arrangement for providing a full feathering, reversible pitch propeller especially adapted for aircraft, and having an automatic constant speed feature. Even more specifically, this invention relates to a simple, foolproof, fail-safe mechanical (as distinguished from hydraulic) arrangement for providing a full feathering, reversible pitch, constant speed aircraft propeller on a solid (i.e., undrilled) engine shaft.

2. Description of the Prior Art

Variable pitch propellers have long been known in the prior art. All of these prior art propellers lack one or more features of the present invention.

U.S. Pat. Nos. 1,693,451 (1928) to McCauley, 1,777,254 (1930) to Connors, 1,801,725 (1931) to Cook, 1,839,895 (1932) to Rossi, 1,887,146 (1932) to Conkling, 2,010,640 (1935) to Michl, 2,054,810 (1936) to Gaba, 2,094,149 (1937) to Gaba, 2,452,444 (1948) to Enerud, 2,510,216 (1950) to Figley, 2,656,971 (1953) to Mader, and 3,000,447 (1961) to Baugher all disclose variable pitch propellers. None provides for automatic constant propeller speed (RPM). Some do not disclose full feathering, and some do not provide for reversing the pitch of the propeller.

U.S. Pat. No. 1,861,150 (1932) to Zipay discloses an adjustable pitch airplane propeller with provision for constant speed operation. However, there is no provision disclosed for full feathering the propeller, nor is there any provision disclosed for reversing the pitch of the propeller.

U.S. Pat. No. 1,914,346 (1933) to Squires discloses a propeller with automatic pitch adjustment. There is no provision disclosed for full feathering the propeller, nor is there any provision disclosed for reversing the pitch of the propeller.

U.S. Pat. Nos. 2,112,965 (1938) to Koster, 2,115,485 (1938) to Dodson, 2,628,684 (1953) to Slatter disclose a constant speed adjustable pitch propeller. However, there is no mention of full feathering the propeller or of reversing the pitch of the propeller.

U.S. Pat. Nos. 3,249,159 (1966) to Biermann, 3,551,069 (1970) to Morris and 3,575,529 (1971) to Biermann disclose a constant speed, adjustable pitch propeller, with provision for full feathering and reversing the pitch of the propeller. However, the systems disclosed are hydraulic and require a drilled engine shaft as part of the hydraulic system piping.

SUMMARY OF THE INVENTION

One of the objects of this invention is to provide means for controlling the pitch and rotational velocity of a propeller and of the engine driving the propeller.

Another of the objects of this invention is to provide an improved full feathering, reversible pitch aircraft propeller having an automatic constant speed feature.

A specific object of this invention is to provide simple, foolproof mechanical means for full feathering and reversing the pitch of an aircraft propeller mounted on a solid engine shaft.

Other and further objects of this invention will become apparent during the course of the following description and by reference to the accompanying drawings and the appended claims.

Briefly, I have discovered that all of the foregoing objects may be attained by providing weights on propeller blades which blades are rotatably mounted on an engine shaft for movement between a low RPM (high pitch) position, a full feathered position, and a high RPM (low pitch) position, the said weights generating centrifugal force as the engine shaft turns, the said centrifugal force tending to rotate and change the pitch of the propeller blades, and by providing a resilient force of controllable value, as by means of an adjustably compressible spring, to the rotatably mounted propeller blades, in such manner that, in a constant RPM mode of operation, the resilient force will complete, at the desired constant RPM, the balance of the pitch changing centrifugal force exerted by the weights and the aerodynamic pitching moments of the propeller blades. For operation in the full high RPM mode and in the reverse thrust mode, I provide means for overriding and/or deactivating the effects of the weights and of the resilient force.

BRIEF DESCRIPTION OF THE DRAWINGS

Referring now to the drawings, in which like numerals represent like parts in the several views.

DESCRIPTION OF THE PREFERRED EMBODIMENT

Engine shaft 1, projecting forwardly of engine housing 2, is provided with longitudinal splineways, and has at its forwardmost end a threaded section 3.

Figure 4:
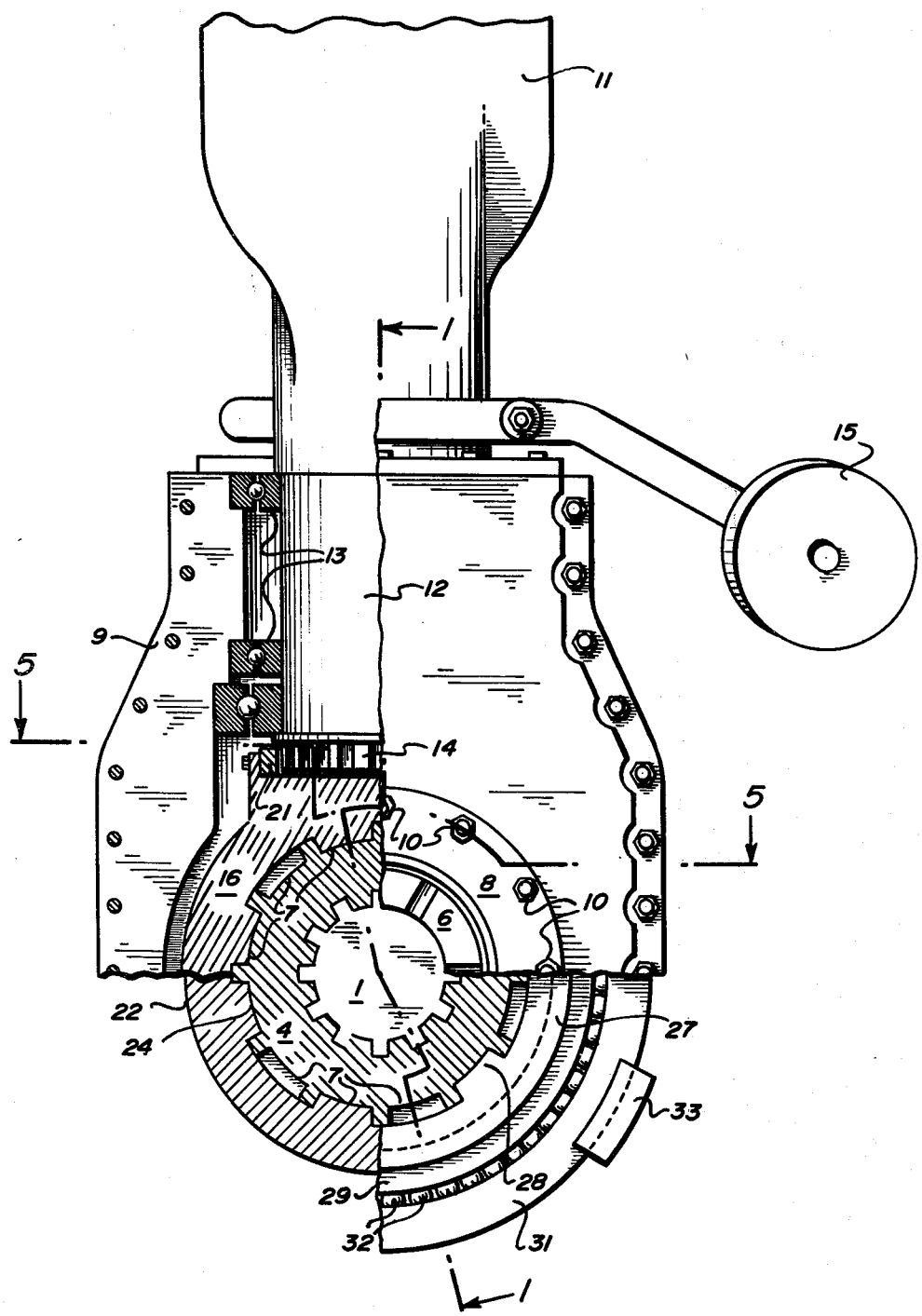
FIG. 4 represents a partially sectioned view in front elevation of the forward end of the aircraft engine shaft, the propeller hub and the propeller shaft hub adapter, showing a portion of one of the propeller blades adjacent thereto, the upper right quadrant of FIG. 4 being a true front elevation, the upper left quadrant of FIG. 4 being a transverse section in elevation taken along the line 4a—4a of FIG. 1, the lower right quadrant of FIG. 4 being a transverse section in elevation taken along the line 4b—4b of FIG. 1, and the lower left quadrant of FIG. 4 being a transverse section in elevation taken along the line 4c—4c of FIG. 1.

Propeller shaft hub adapter 4, which is an elongated tubular member provided internally with longitudinal splineways, is mounted to engine shaft 1. The splineways and splines of the propeller shaft hub adapter 4 and the engine shaft 1 interlock, as shown in FIG. 4, whereby the said propeller shaft hub adapter 4 is fixed against rotation relative to the said engine shaft 1.

Rear and forward split rings 5 and 5a, respectively, are provided as shown to center the propeller shaft hub adapter 4 on the engine shaft 1. Those faces of split rings 5 and 5a facing the propeller shaft hub adapter 4 are inclined, as shown. Rear split ring 5 has an internal configuration permitting it to slide rearwardly on the engine shaft 1 and to stop at the position shown in FIG. 1-3, viz. against the rearward ends of the splineways in the engine shaft 1. Thus, in its rearmost position, rear split ring 5 acts as a rearward longitudinal stop, as well as a centering device, for propeller shaft hub adapter 4. It will be apparent that, in assembling propeller shaft hub adapter 4 to engine shaft 1, when nut 6 is threaded on threaded section 3 of the engine shaft 1 so as to firmly bear against the forward split ring 5a which, in turn, is caused thereby to be forced into the forward end of propeller shaft hub adapter 4, the said propeller shaft hub adapter 4 will be forced rearwardly against rear split ring 5 and will thereby be centered about engine shaft 1 and will also be held against movement longitudinally of the said engine shaft 1.

Other methods and arrangements for securing the propeller shaft hub adapter 4 to engine shaft 1 will occur to those familiar with this art, and this invention is not to be considered as being limited to the specific arrangement herein described.

Propeller shaft hub adapter 4 is provided with radially spaced, longitudinally extending, splineways 7. The forwardmost end of propeller shaft hub adapter 4 terminates in an outwardly extending flange 8.

Propeller hub 9 is mounted around propeller shaft hub adapter 4 and is fastened thereto by means of threaded bolts 10 extending through flange 8 into threaded apertures in the said propeller hub 9.

A propeller blade 11 is shown as being rotatably mounted in propeller hub 9, the cylindrical stem 12 of the propeller blade 11 being supported in bearings 13 as is known in the art. It will be appreciated that, while only one propeller blade 11 is shown for illustrative purposes only, this invention contemplates a minimum of two, and where desired more than two, such propeller blades 11 radially equispaced around the longitudinal axis of the engine shaft 1.

The innermost portion of the stem 12 of the propeller blade 11 is provided with a spur gear 14. A centrifugal weight 15 of predetermined mass is clamped to the stem 12 outside the propeller hub 9 as shown.

Pitch change slide 16 is a tubular member positioned inside propeller hub 9, having an internal spring-receiving recess 17 facing rearwardly, and having a plurality of longitudinal splines 18 extending rearwardly out of the propeller hub 9 and slidably mounted in alternate splineways 7 of propeller shaft hub adapter 4. Ring 19 is fastened to the rearwardmost ends of splines 18 by means of threaded bolts 20. A toothed rack 21 is secured to pitch change slide 16 in engaged relationship with spur gear 14. It will be apparent that, when pitch change slide 16 is reciprocated along propeller shaft hub adapter 4, the toothed engagement of rack 21 with spur gear 14 will rotate the propeller blade 11 about its longitudinal axis. In other words, the pitch of the propeller blade 11 can be changed by moving the pitch change slide 16 longitudinally of the propeller shaft hub adapter 4. It will be evident that, for each propeller blade 11, a toothed rack 21 will be provided and mounted on the pitch change slide 16 in such position as to engage the spur gear 14 of the associated propeller blade 11.

Spring pressure slide 22 has a flange 23 positioned inside propeller hub 9, the said flange 23 facing the recess 17 of pitch change slide 16. Spring pressure slide 22 also has a plurality of longitudinal splines 24 extending rearwardly out of the propeller hub 9, and slidably mounted in alternate splineways 7 of propeller shaft hub adapter 4, the splineways 7 in the said propeller shaft hub adapter 4 receiving splines 24 of the spring pressure slide 22 being adjacent to the splineways 7 in the said propeller shaft hub adapter 4 receiving splines 18 of pitch change slide 16. The rearmost ends 25 of the splines 24 lie in a common transverse plane.

In the foregoing manner, both the pitch change slide 16 and the spring pressure slide 22 are constrained to movement longitudinally along the propeller shaft hub adapter 4, each being longitudinally movable independently of the other.

A coiled spring 26 is mounted within recess 17 of pitch change slide 16, the rearward end of spring 26 bearing against flange 23 of spring pressure slide 22.

Control slide 27 is provided with internal splines 28 slidably positioned in the same alternate splineways 7 of propeller shaft hub adapter 4 receiving splines 24 of spring pressure slide 22. Thus, as shown, splines 28 will occupy the same splineways 7 as, but rearwardly of, splines 24. Control slide 27 has an external channel in which is mounted the inner portion 29 of conventional thrust bearing 30. The outer portion 31 of the conventional thrust bearing 30, separated from the inner portion 29 by means of ball bearings 32, is connected to control rod 33 which extends back to the cabin (not shown) of the aircraft, and which is constrained by suitable guide means (such as sleeves or the like) to longitudinal movement only. It will be apparent that, when the control rod 33 is reciprocated longitudinally, the control slide 27 is also caused to reciprocate longitudinally. It will also be apparent that, in operation, the engine shaft 1 is rotating together with every part supported thereon, and the two part thrust bearing 30 permits control of the longitudinal position of the control slide 27 despite the rotation of the engine shaft 1. Although thrust bearing 30 is shown as having a ball bearing feature, it should be understood that any type of two way thrust bearing can be employed for this purpose, as will be evident to those familiar with this art. It will be further apparent that the degree of compression of spring 26 can be adjusted, while engine shaft 1 is rotating, by operating the control rod 33 to suitably position control slide 27 which, in turn, bears against splines 24 of spring pressure slide 22 which, in turn, bears against spring 26.

The operation of the present invention will now be described.

Let it be assumed that the engine to which engine shaft 1 is connected is operating at a constant throttle setting, so that engine shaft 1 and all components mounted thereon are rotating about the longitudinal axis, or axis of rotation, of the engine shaft 1. It will be apparent that each weight 15 will tend to move away from the said axis of rotation and thus will tend to rotate its respective propeller blade 11 about the longitudinal axis of stem 12, and the amount of blade pitch rotative force applied by weights 15 is proportional to the rotation speed (RPM) of the engine and propeller assembly. Control rod 33 is advanced or retracted, as the case may be, from the cabin of the aircraft to such appropriate position as will in turn position spring pressure slide 22 in the proper location to provide that degree of compression in spring 26 as will complete the balance of the pitch-changing centrifugal force exerted by weights 15 and the aerodynamic pitching moments of the propeller blades 11, such that the selected RPM of the engine and propeller is held constant at the value selected. Thus, adjustment of the position of control rod 33 will permit adjustment of the RPM of the engine. A specific RPM of the engine will therefore correspond with a particular setting of control rod 33.

Figure 1:
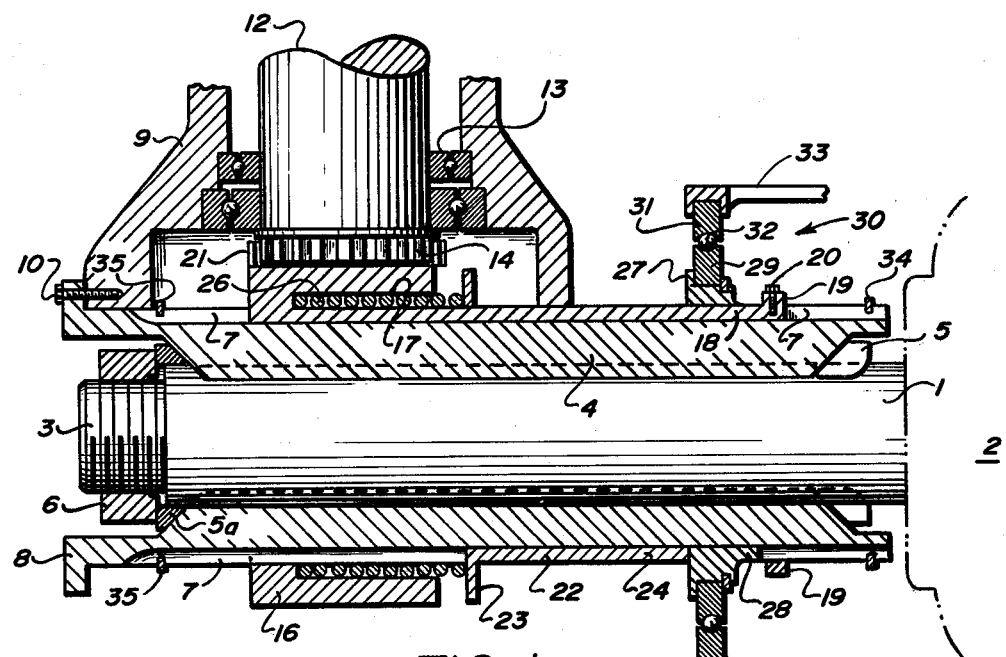
FIG. 1 represents a medial longitudinal section of the forward end of an aircraft engine shaft showing a portion of one of the propeller blades adjacent the engine shaft and showing the present invention mounted on the engine shaft and in position for the constant RPM mode of operation, taken along the line 1—1 of FIG. 4.

In the constant RPM mode of operation, as shown in FIG. 1, spring pressure slide 22 will be spaced rearwardly of the mouth of recess 17 of pitch change slide 16, and control slide 27 will be spaced forwardly of ring 19, thus giving full effect to the compression of spring 26 in the balancing of the forces of the spring 26, the weights 15, and the blades 11 aerodynamic pitching moments to maintain the engine RPM constant at the selected value.

Figure 2:
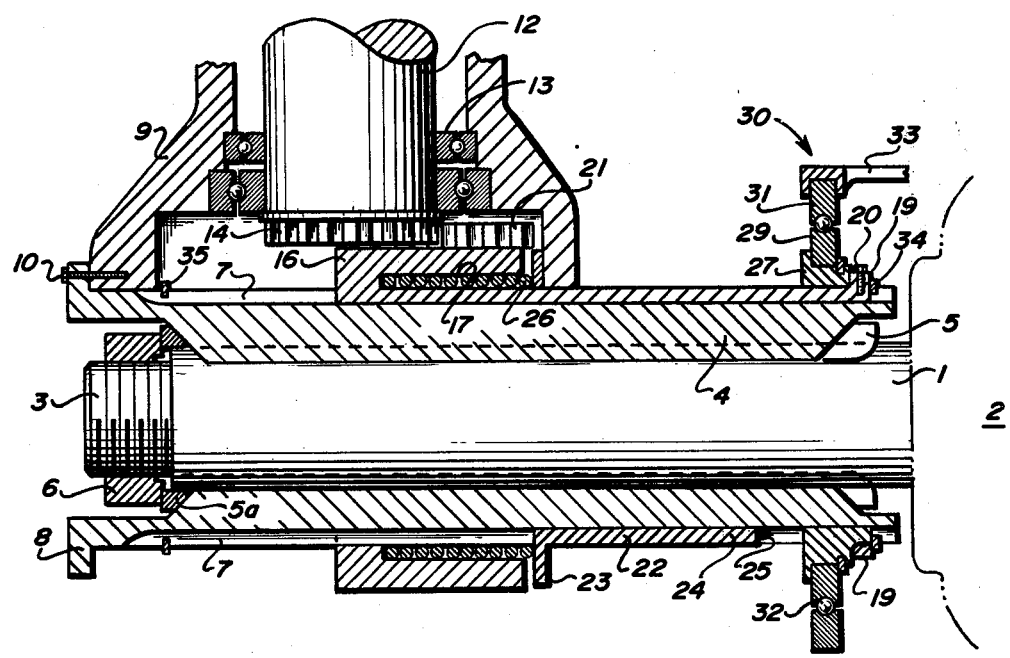
FIG. 2 represents a medial longitudinal section of the forward end of an aircraft engine shaft similar to FIG. 1, showing the present invention mounted thereon and in position for the full high RPM (low pitch) mode of operation.

The present invention is capable of operation selectively in a full high RPM (low pitch) mode. In this mode of operation, as shown in FIG. 2, control rod 33 is operated from the cabin of the aircraft so as to force control slide 27 rearwardly against ring 19 and the latter against stop ring 34, and thereby hold pitch change slide 16 in its rearmost position, with its attached toothed racks 21 and engaged spur gears 14 holding the propeller blades 11 in their lowest pitch (full high RPM) position.

Figure 3:
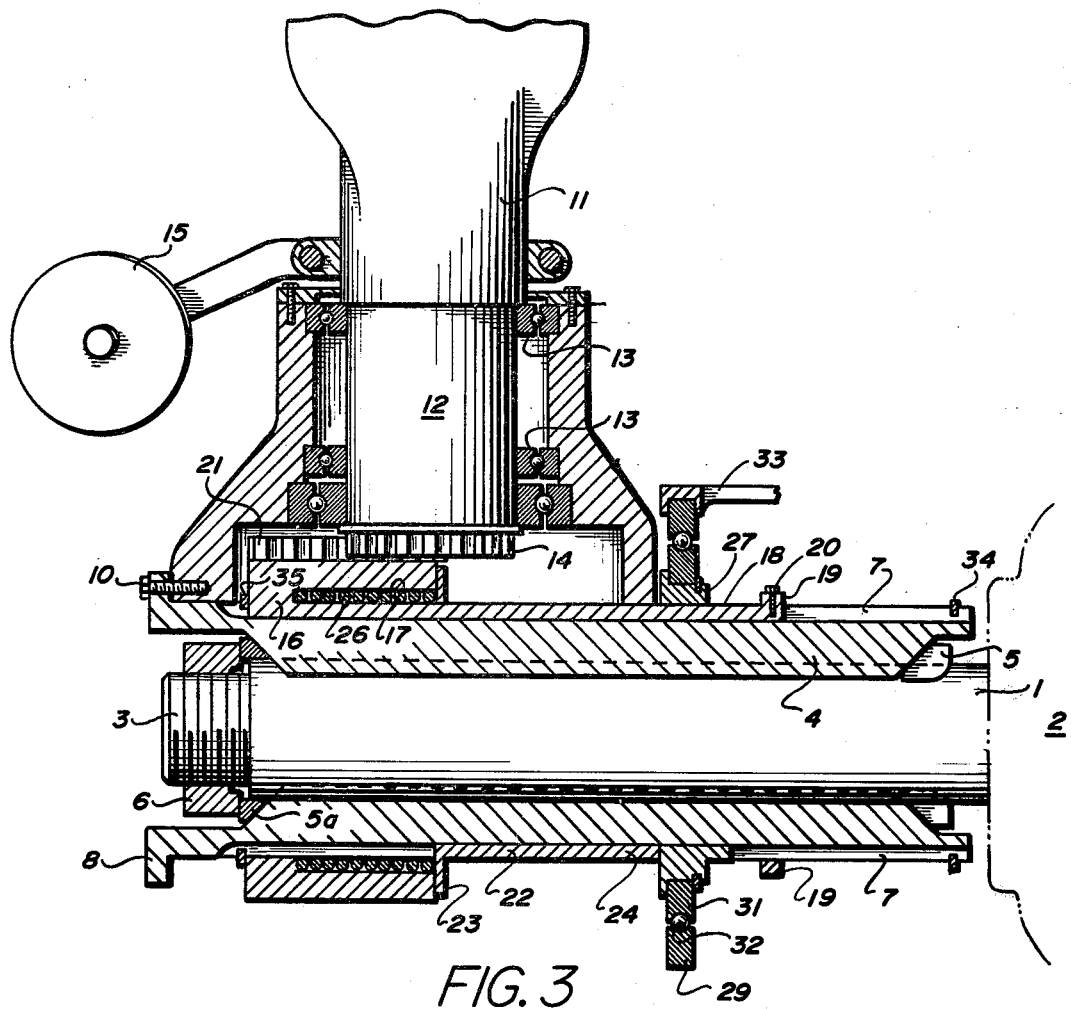
FIG. 3 represents a medial longitudinal section of the forward end of an aircraft engine shaft similar to FIG. 1, showing the present invention mounted thereon and in position for the reverse thrust mode of operation.
Figure 5:
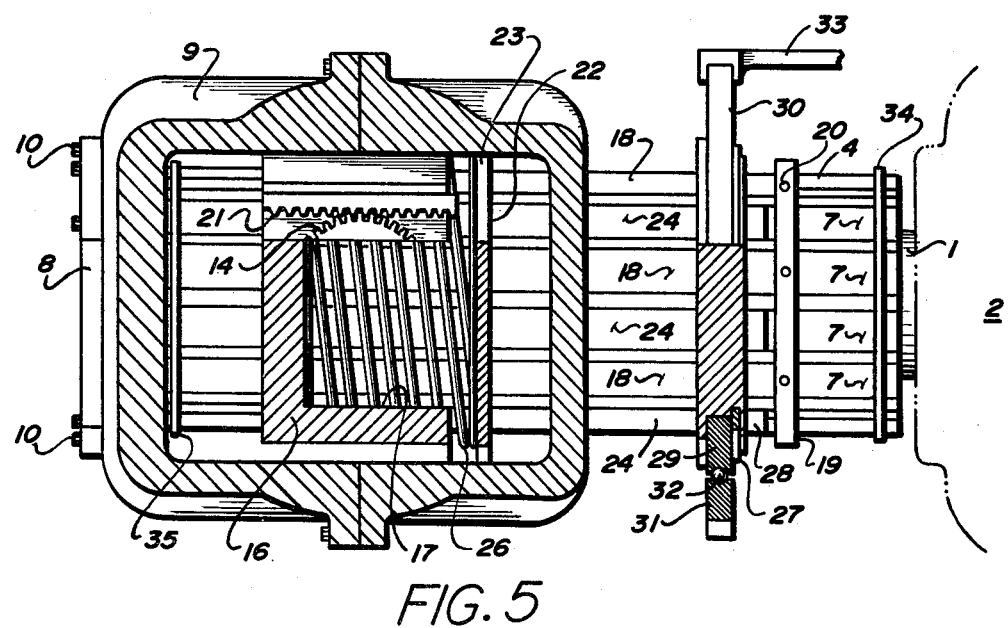
FIG. 5 represents a partially sectioned view in plan of the forward end of the aircraft engine shaft, the propeller hub and the propeller shaft hub adapter, taken along the line 5—5 of FIG. 4, showing in particular the relationship among the pitch change slide, the spring pressure slide and the control slide.

In the reverse thrust mode of operation, as shown in FIG. 3, the control rod 33 is operated from the cabin of the aircraft so as to force control slide 27 forwardly against the rear ends of the splines 24 of spring pressure slide 22, thereby forcing the said spring pressure slide 22 forwardly. Flange 23 of the spring pressure slide 22 will, as the latter is continually forced forwardly, engage the mouth of the recess 17 of pitch change slide 16 and will force the said pitch change slide 16 to its forwardmost position against stop ring 35. Movement of the pitch change slide 16 forwardly as described will cause toothed racks 21 thereon to rotate spur gears 14 of propeller blades 11 thereby turning propeller blades 11 through full feather pitch to reverse pitch. Because the spring pressure slide 22 is held in this position by control rod 33, weights 15, spring 26 and blade aerodynamic pitching moments will have no effect on the pitch of propeller blades 11.

If, while operating in the constant RPM mode, spring 26 should break or otherwise fail, the aircraft would still be operable. In such a state, there being no spring force to control and complete the balance of the effects of the rotating weights 15 and the blades 11 aerodynamic pitching moments, this imbalance of forces would tend to reduce the pitch of the propeller blades 11. In rotating to such a reduced pitch, the propeller blades 11 would rotate their respective spur gears 14 which, because of their toothed engagement with racks 21, would drive pitch change slide 16 rearwardly until the mouth of recess 17 engaged flange 23 of spring pressure slide 22. Thereupon, because further rearward movement of pitch change slide 16 is prevented, no further reduction in pitch of propeller blades 11 can occur. Moreover, by operating control rod 33 to force the spring pressure slide 22 forwardly, the pitch of propeller blades 11 can be increased to the extent desired.

I claim:
1. Variable pitch propeller means comprising:
(a) an engine shaft adapted to be rotated about its longitudinal axis,
(b) a plurality of propeller blades spaced around the longitudinal axis of the engine shaft, each propeller blade having a longitudinal axis arranged perpendicularly to the longitudinal axis of the engine shaft,
(c) first means mounting each of said propeller blades to said engine shaft for rotation about its respective longitudinal axis,
(d) a plurality of weights, each weight being secured to one of said propeller blades spaced from the longitudinal axis thereof, said weights being adapted to generate centrifugal force tending to rotate the propeller blades about their respective longitudinal axes when said engine shaft is rotating,
(e) a plurality of spur gears, each spur gear being mounted to one of said propeller blades,
(f) a plurality of toothed racks, each toothed rack engaging one of said spur gears,
(g) second means mounting said toothed racks for movement longitudinally of said engine shaft,
(h) spring means bearing against said second means,
(i) third means bearing against said spring means and adapted to compress said spring means and thereby resiliently force said toothed racks longitudinally of said engine shaft to rotate said propeller blades about their respective longitudinal axes,
(j) the force exerted by said third means and resiliently applied to said toothed racks to rotate said propeller blades completing the balance of the centrifugal forces exerted by the weights and the aerodynamic pitching moments of the propeller blades, thereby providing constant RPM of the propeller blades at a desired value corresponding to the degree of compression of said spring means,
(k) fourth means adapted to move said second means and said third means to a first extreme position overriding said spring means and rotating said propeller blades to an extreme low pitch position or selectively to a second extreme position rotating said propeller blades to a reverse thrust position,
(l) a tubular sleeve mounted on said engine shaft and having radially spaced longitudinally extending splineways formed in the exterior surface thereof,
(m) said second means having radially spaced longitudinally extending splines, said splines being slidably received in the splineways of said tubular sleeve,
(n) said third means having radially spaced longitudinally extending splines, said splines being slidably received in the splineways of said tubular sleeve,
(o) said fourth means having radially spaced longitudinally extending splines, said splines being slidably received in the splineways of said tubular sleeve, said fourth means being adapted to move said third means in a first direction against said spring means or selectively to move said second means in the opposite direction.

2. Variable pitch propeller means comprising:
(a) an engine shaft adapted to be rotated about its longitudinal axis,
(b) a plurality of propeller blades spaced around the longitudinal axis of the engine shaft, each propeller blade having a longitudinal axis arranged perpendicularly to the longitudinal axis of the engine shaft,
(c) first means mounting each of said propeller blades to said engine shaft for rotation about its respective longitudinal axis,
(d) a plurality of weights, each weight being secured to one of said propeller blades spaced from the longitudinal axis thereof, said weights being adapted to generate centrifugal force tending to rotate the propeller blades about their respective longitudinal axes when said engine shaft is rotating,
(e) a plurality of spur gears, each spur gear being mounted to one of said propeller blades,
(f) a plurality of toothed racks, each toothed rack engaging one of said spur gears,
(g) second means mounting said toothed racks for movement longitudinally of said engine shaft,
(h) spring means bearing against said second means,
(i) third means bearing against said spring means and adapted to compress said spring means and thereby resiliently force said toothed racks longitudinally of said engine shaft to rotate said propeller blades about their respective longitudinal axes,
(j) the force exerted by said third means and resiliently applied to said toothed racks to rotate said propeller blades completing the balance of the centrifugal forces exerted by the weights and the aerodynamic pitching moments of the propeller blades, thereby providing constant RPM of the propeller blades at a desired value corresponding to the degree of compression of said spring means,
(k) fourth means adapted to move said second means and said third means to a first extreme position overriding said spring means and rotating said propeller blades to an extreme low pitch position or selectively to a second extreme position rotating said propeller blades to a reverse thrust position,
(l) a tubular sleeve mounted on said engine shaft and having radially spaced longitudinally extending splineways formed in the exterior surface thereof,
(m) said second means having radially spaced longitudinally extending splines, said splines being slidably received in the splineways of said tubular sleeve,
(n) said third means having radially spaced longitudinally extending splines, said splines being slidable received in the splineways of said tubular sleeve,
(o) said fourth means having radially spaced longitudinally extending splines, said splines being slidably received in the splineways of said tubular sleeve, said fourth means being adapted to move said third means in a first direction against said spring means to provide a desired degree of compression in said spring means or selectively to override said spring means or selectively to move said second means in the opposite direction to override said spring means.

* * * * *